(12) United States Patent
Grant et al.

(10) Patent No.: US 7,069,173 B2
(45) Date of Patent: Jun. 27, 2006

(54) SYSTEM AND METHOD FOR DETERMINING AN ANGULAR POSITION OF A ROTOR AND A RADIAL POSITION OF THE ROTOR

(75) Inventors: John Wesley Grant, Gardnerville, NV (US); James J. Schmid, Kirkland, WA (US); Craig J. Foster, Carson City, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/904,258

(22) Filed: Nov. 1, 2004

(65) Prior Publication Data

US 2006/0100819 A1    May 11, 2006

(51) Int. Cl.
*G01C 19/00* (2006.01)
(52) U.S. Cl. ........................ 702/151; 702/150
(58) Field of Classification Search ............... 702/151, 702/77, 56
See application file for complete search history.

(56) References Cited

U.S. PATENT DOCUMENTS

| | | | | |
|---|---|---|---|---|
| 4,135,244 A | * | 1/1979 | Davis | 702/56 |
| 4,345,472 A | * | 8/1982 | Hara et al. | 73/462 |
| 5,382,900 A | | 1/1995 | Hayashi | 324/207.23 |
| 5,442,285 A | * | 8/1995 | Zombo et al. | 324/227 |
| 2002/0105338 A1 | | 8/2002 | Reverdy | 324/545 |
| 2004/0011149 A1 | | 1/2004 | Carroll | 73/866.1 |
| 2004/0060371 A1 | | 4/2004 | Barkhoudarian | 73/862.331 |

FOREIGN PATENT DOCUMENTS

GB    2357849 A    4/2001

OTHER PUBLICATIONS

GB Search Report, GB0521897.9, Search Dated Dec. 7, 2005.

* cited by examiner

*Primary Examiner*—John Barlow
*Assistant Examiner*—Jonathan Moffat
(74) *Attorney, Agent, or Firm*—Cantor Colburn LLP

(57) ABSTRACT

A system and a method for determining an angular position of a rotor and a radial position of the rotor are provided. The rotor has either a slot or a protrusion on the rotor. The rotor is centered about a center point. The method includes generating a first signal utilizing a first sensor disposed proximate the slot or protrusion of the rotor. The method further includes determining a first angular position of the rotor by identifying a first corrupted portion of the first signal. The method further includes removing the first corrupted portion of the first signal to obtain a second non-corrupted position signal. The method further includes determining a first radial coordinate of the center point of the rotor based on the second non-corrupted position signal.

16 Claims, 11 Drawing Sheets

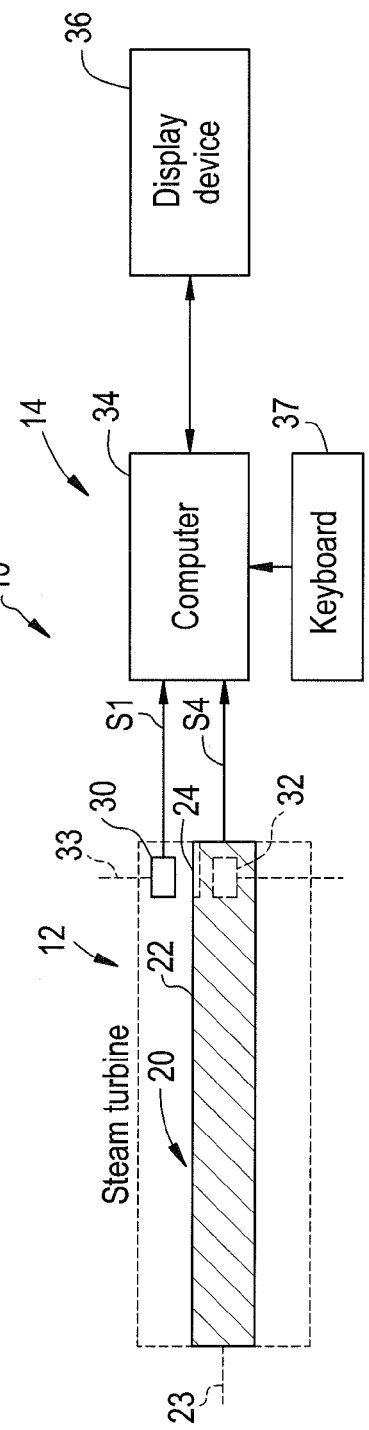
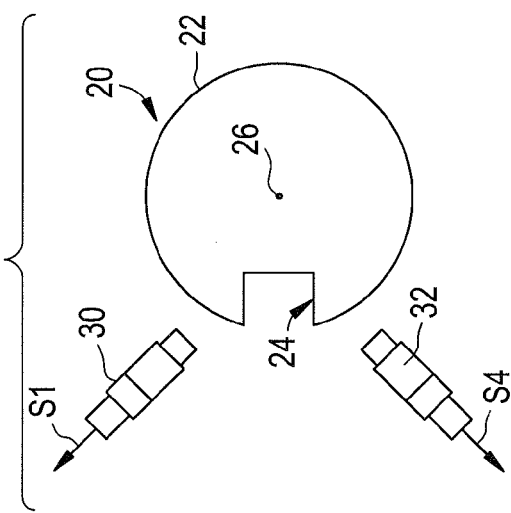

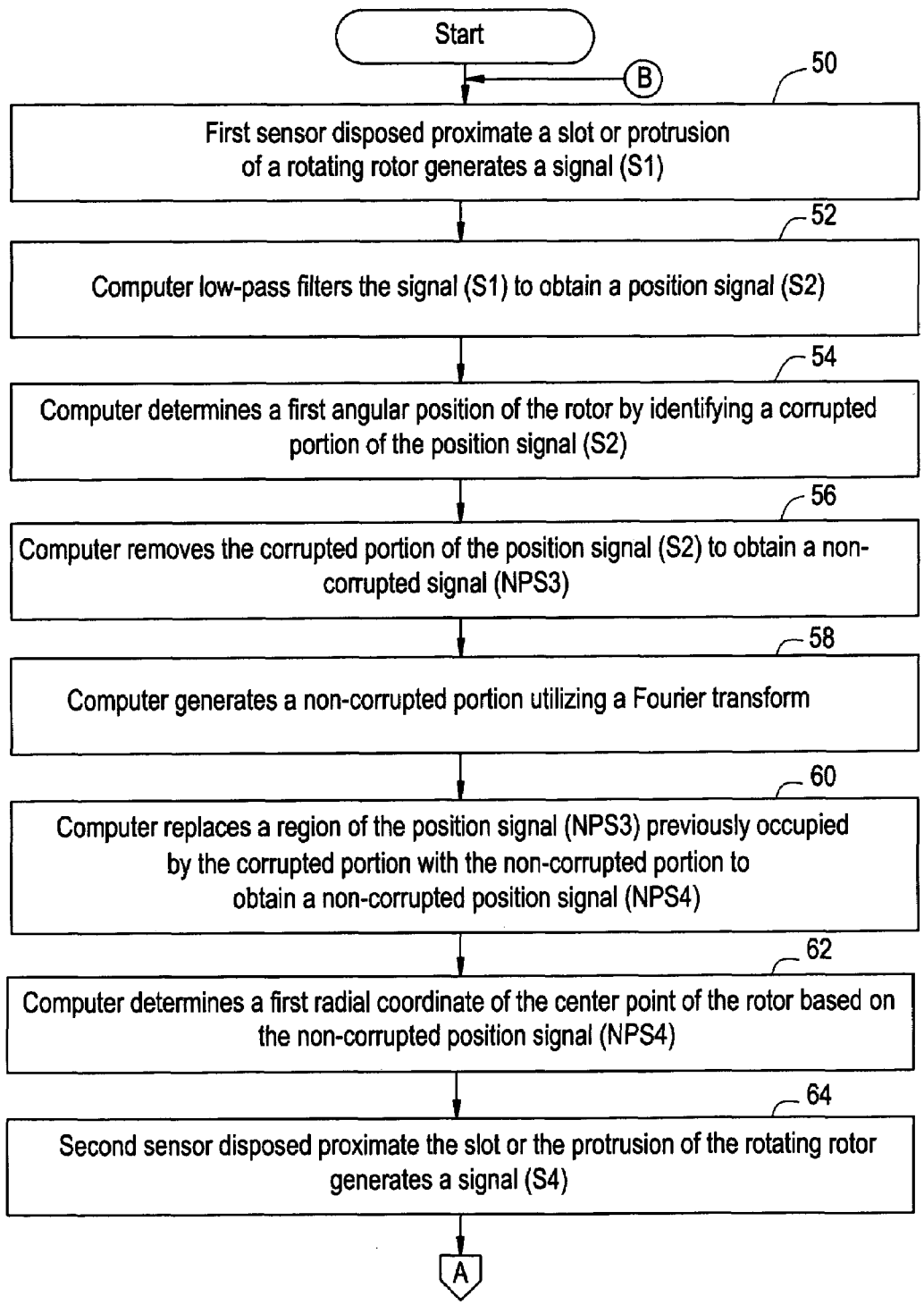

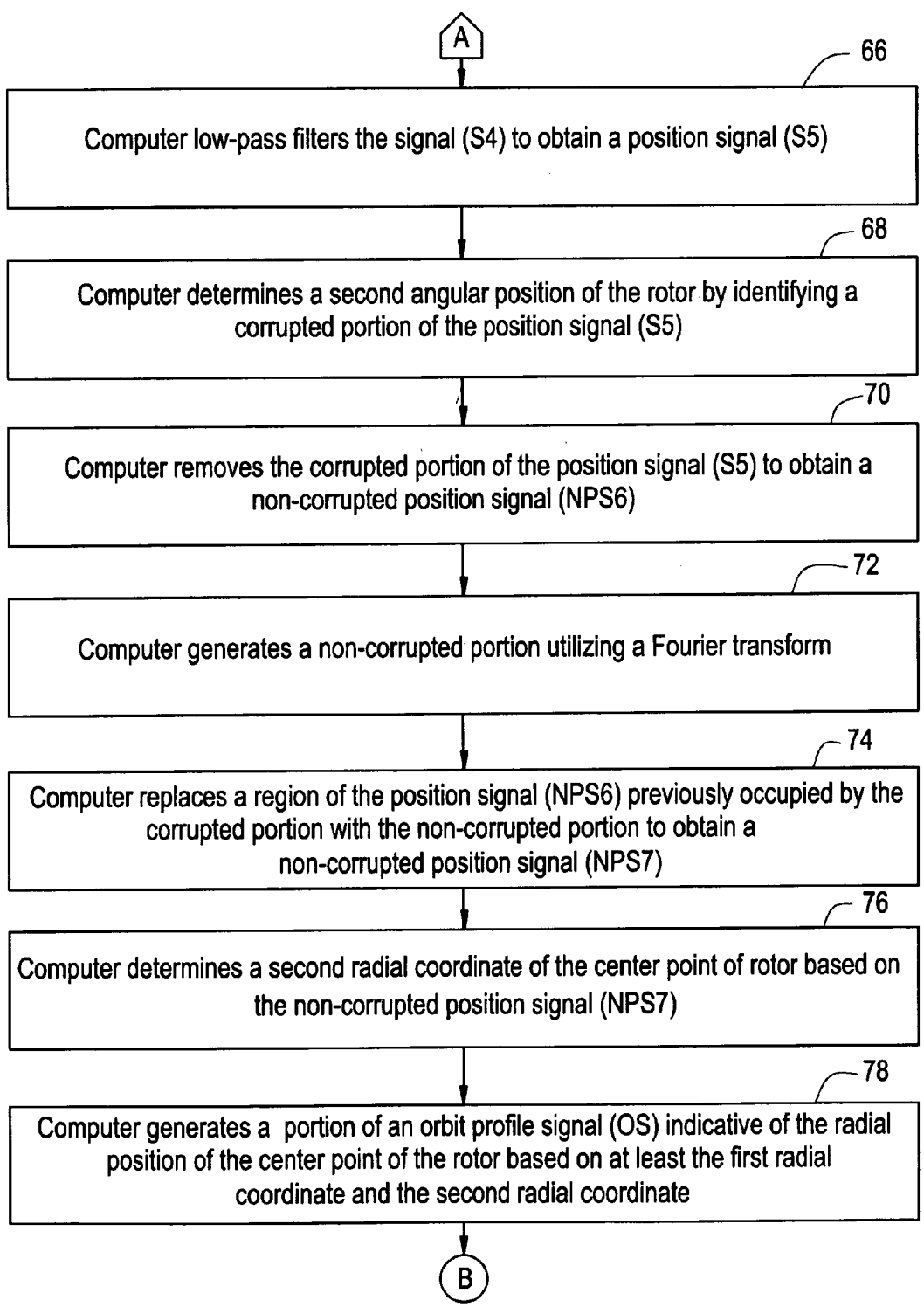

Signal (S1)

Position signal (S2)

Wavelet coeffecient signal (WCS1)

Derivative wavelet coeffecient signal (DWCS1)

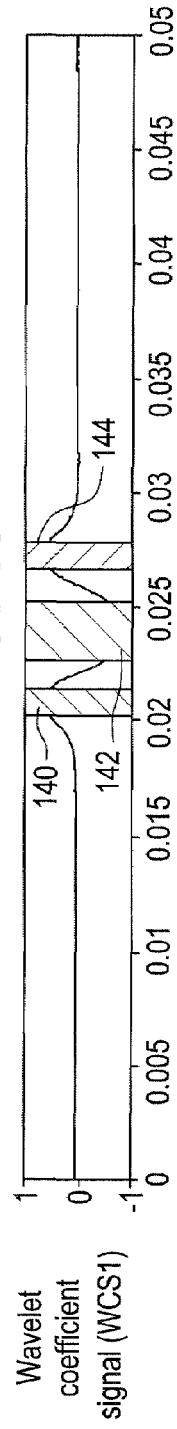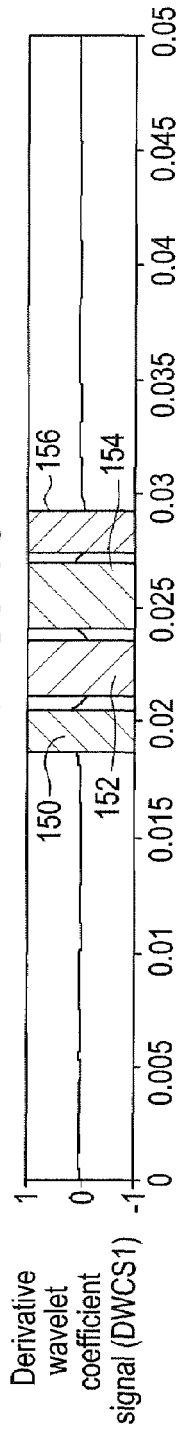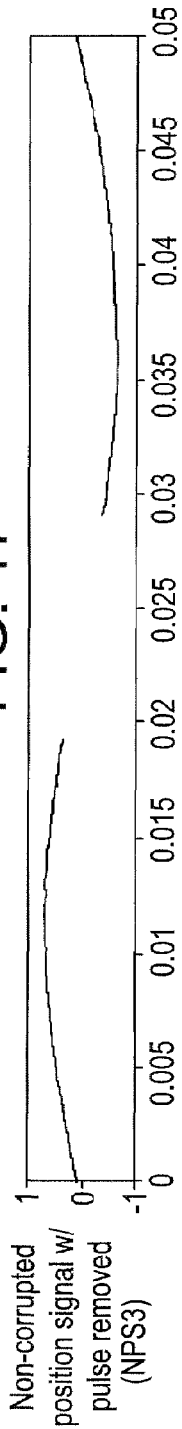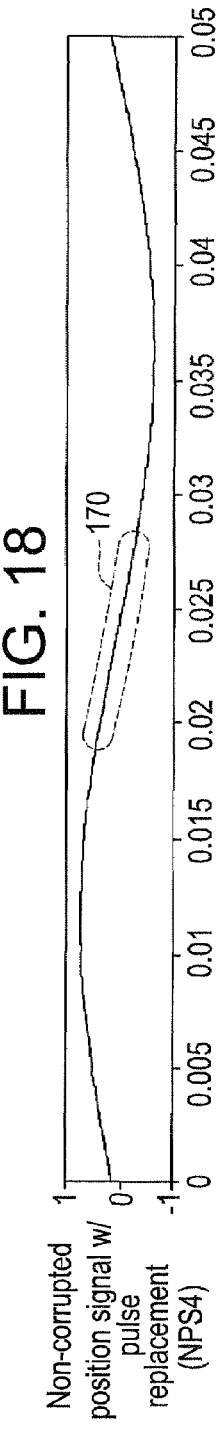

SYSTEM AND METHOD FOR DETERMINING AN ANGULAR POSITION OF A ROTOR AND A RADIAL POSITION OF THE ROTOR

BACKGROUND OF THE INVENTION

Rotating machines, such as gas turbines, steam turbines, hydro-turbines, pumps and motors, rotate a rotor at predetermined speeds. To monitor the angular position of the rotor, a first sensor is disposed adjacent a keyway notch disposed in the rotor. The first sensor generates a signal indicating the position of the notch and thus the angular position of the rotor. The radial position of the rotor may also be monitored utilizing second and third sensors disposed on another plane of the rotor proximate a smooth outer surface of the rotor. The second and third sensors generate signals indicative of a radial position of the rotor.

A significant drawback with this methodology, is that there may be only one accessible portion of the rotating machine (e.g., a single plane) where sensors can be disposed for monitoring the angular position and radial position of the rotor. Further, the accessible portion of the rotating machine may comprise a portion of a rotor that contains a keyway notch or key protrusion. As a result, the second and third sensors cannot be disposed proximate a smooth outer surface of the rotor as desired for determining radial displacement of the rotor.

Accordingly, there is a need for a system and method that utilizes sensors configured to measure both an angular position and a radial position of a rotor proximate a portion of the rotor containing a keyway notch or key protrusion.

BRIEF DESCRIPTION OF THE INVENTION

A method for determining an angular position of a rotor and a radial position of the rotor in accordance with an exemplary embodiment is provided. The rotor has either a slot or a protrusion on the rotor. The rotor is centered about a center point. The method includes generating a first signal utilizing a first sensor disposed proximate the slot or protrusion of the rotor. The method further includes determining a first angular position of the rotor by identifying a corrupted portion of the first signal. The method further includes removing the corrupted portion of the first signal to obtain a non-corrupted position signal. The method further includes determining a first radial coordinate of the center point of the rotor based on the non-corrupted position signal.

A system for determining an angular position of a rotor and a radial position of the rotor in accordance with another exemplary embodiment is provided. The rotor has either a slot or a protrusion on the rotor. The rotor is centered about a center point. The system includes a first sensor disposed proximate the slot or the protrusion of the rotor, the first sensor configured to generate a first signal. The system further includes a computer operably coupled to the first sensor and receiving the first signal. The computer is configured to determine a first angular position of the rotor by identifying a corrupted portion of the first signal. The computer is further configured to remove the corrupted portion of the first signal to obtain a non-corrupted position signal. The computer is further configured to determine a first radial coordinate of the center point of the rotor based on the non-corrupted position signal.

An article of manufacture in accordance with another exemplary embodiment is provided. The article of manufacture includes a computer storage medium having a computer program encoded therein for determining an angular position of a rotor and a radial position of the rotor. The rotor has a slot or a protrusion. The rotor is centered about a center point. The computer storage medium includes code for sampling a first signal from a first sensor disposed proximate the slot or the protrusion of the rotor. The computer storage medium further includes code for determining a first angular position of the rotor by identifying a corrupted portion of the first signal. The computer storage medium further includes code for removing the corrupted portion of the first signal to obtain a non-corrupted position signal. The computer storage medium further includes code for determining a first radial coordinate of the center point of the rotor based on the non-corrupted position signal.

Other systems and/or methods according to the embodiments will become or are apparent to one with skill in the art upon review of the following drawings and detailed description. It is intended that all such additional systems and methods be within the scope of the present invention, and be protected by the accompanying claims.

BRIEF DESCRIPTION OF THE DRAWINGS

FIG. 1 is a block diagram of a steam turbine system having a steam turbine and a monitoring system in accordance with an exemplary embodiment;

FIG. 2 illustrates a portion of a steam turbine system of FIG. 1;

FIGS. 3–6 are flowcharts of a method for determining an angular position of a rotor and a radial position of the rotor;

FIG. 15 is a schematic of an enlarged portion of the wavelet coefficient signal (WCS1) of FIG. 9;

FIG. 16 is a schematic of an enlarged portion of the derivative wavelet coefficient signal (DWCS1) of FIG. 10;

FIG. 17 is a schematic of an enlarged portion of the non-corrupted position signal (NPS3) of FIG. 11;

FIG. 18 is a schematic of an enlarged portion of the non-corrupted position signal (NPS4) of FIG. 12;

DETAILED DESCRIPTION OF THE INVENTION

Figure 5:
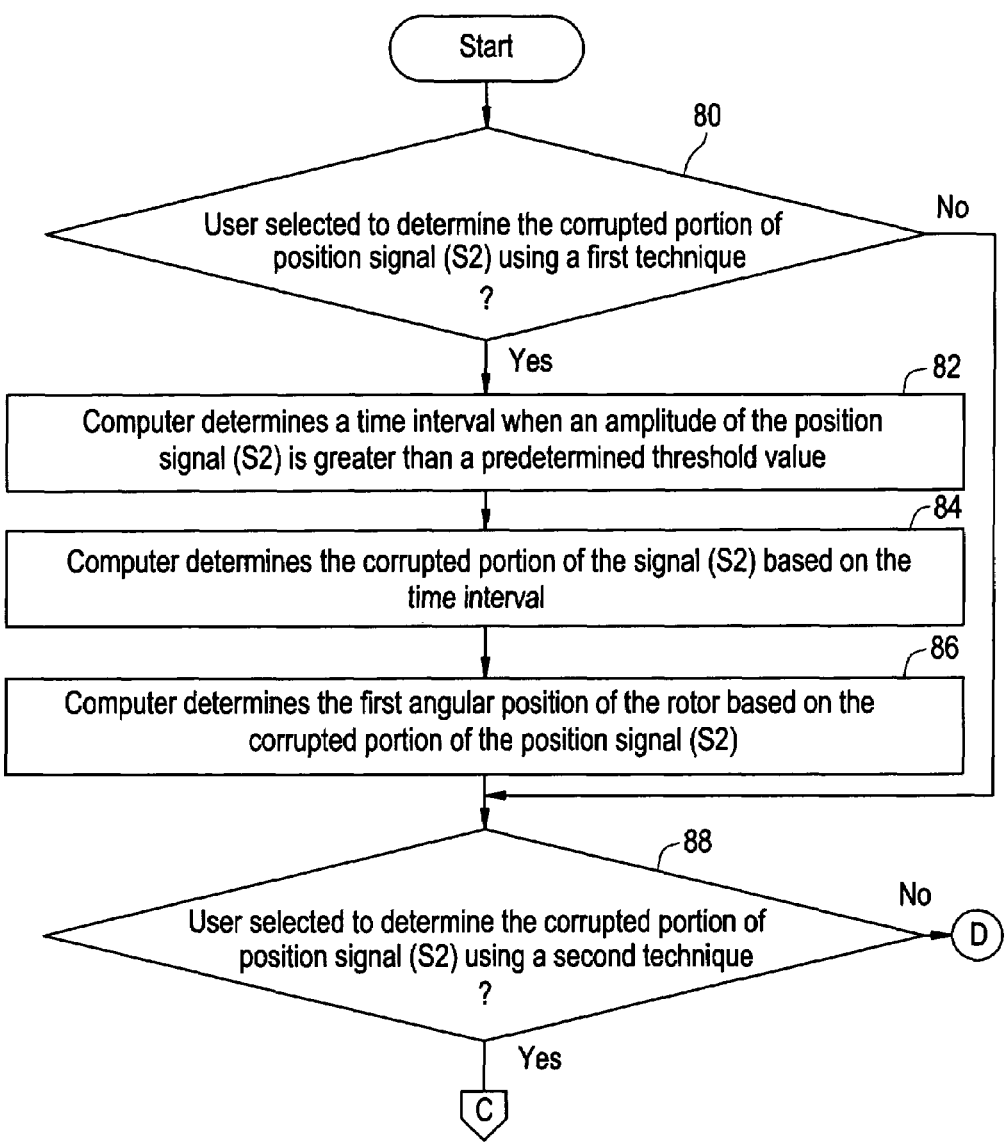
Figure 6:
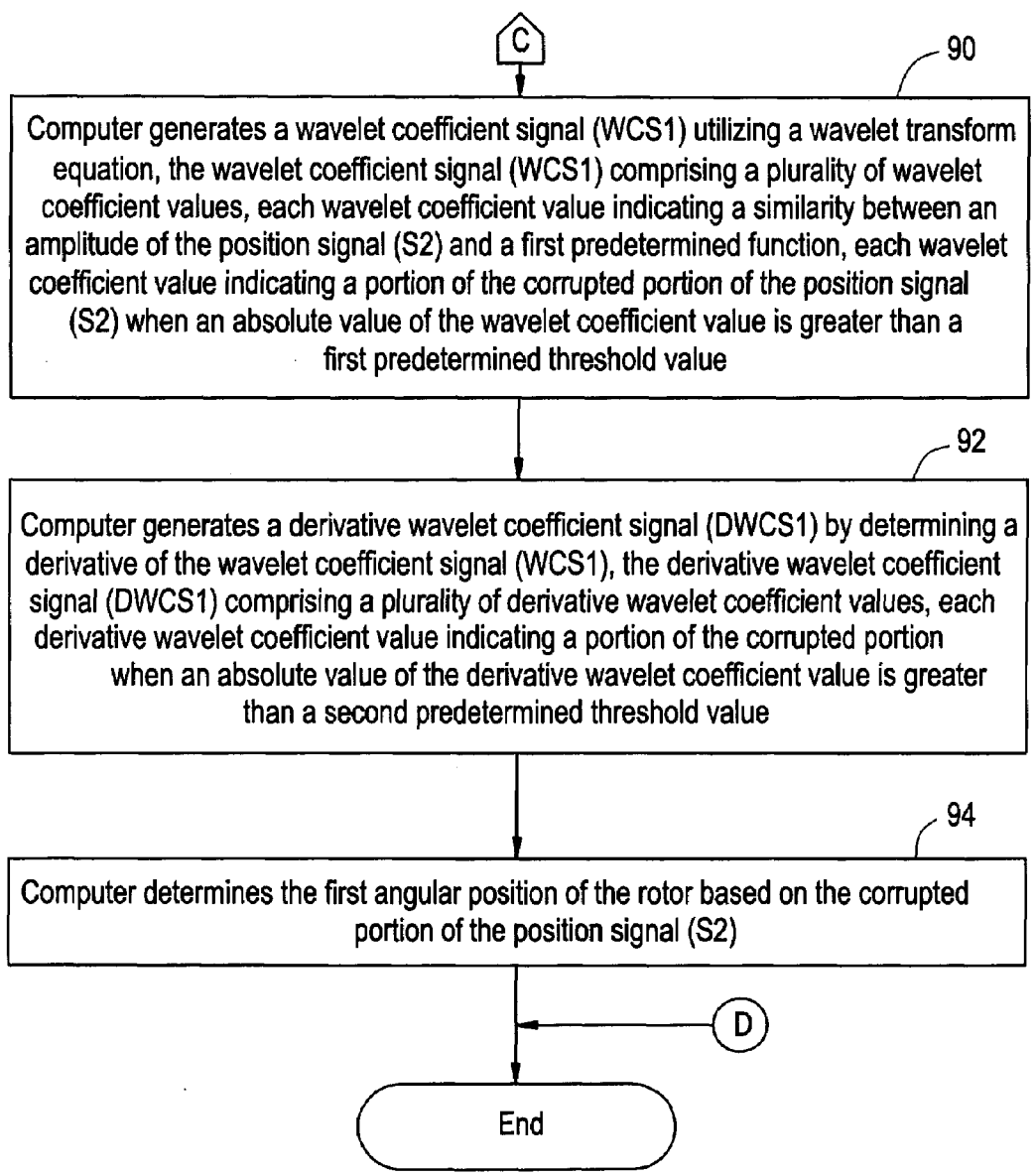

Referring to FIG. 1, a steam turbine system 10 having a steam turbine 12 and a monitoring system 14 is illustrated. The steam turbine 12 includes a rotor 20 configured to rotate about an axis 23. The rotor 20 comprises a cylindrical portion 22 having a slot 24 extending into the portion 22. In an alternate embodiment, the rotor 20 has a protrusion or key (not shown) extending radially outwardly from the portion 22 replacing the slot 24.

The monitoring system 14 is provided to determine both an angular position of the rotor 20 and a radial position of the rotor 20 during rotation of the rotor 20. During rotation of the rotor 20, the angular position of the rotor 20 constantly changes. Further, during rotation of the rotor 20, a center point 26 of the rotor 20 can cyclically move back and forth relative to the axis 23. Accordingly, a radial position of the rotor 20 also changes. The monitoring system 14 includes eddy current sensors 30, 32, a computer 34, a display device 36, and a keyboard 37.

The eddy current sensor 30, 32 generate signals (S1), (S4), respectively, that are used to determine the angular position of the rotor 20 and the radial position of the rotor 20. The eddy current sensors 30, 32 are disposed proximate both a plane 33 that traverses the rotor 20 and the slot 24 extending into the rotor 20. The eddy current sensors 30, 32 are disposed at a 90-degree angle relative to one another with respect to a center point 26 of the rotor 20. Of course, the sensors 30, 32 could be disposed at an angle less than 90-degrees from one another or greater than 90-degrees from one another.

Figure 7:
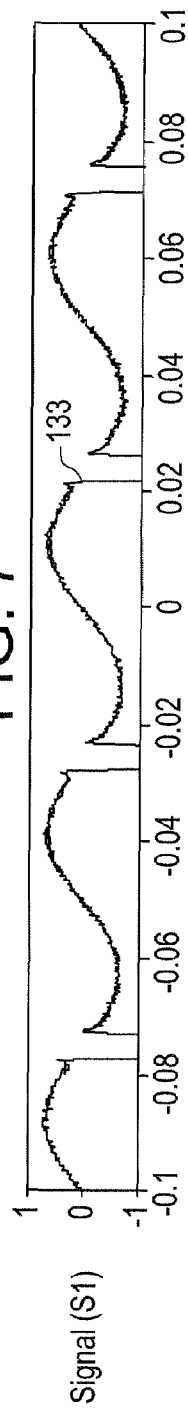
FIG. 7 is a schematic of a signal (S1) generated by a first eddy current sensor.
Figure 8:
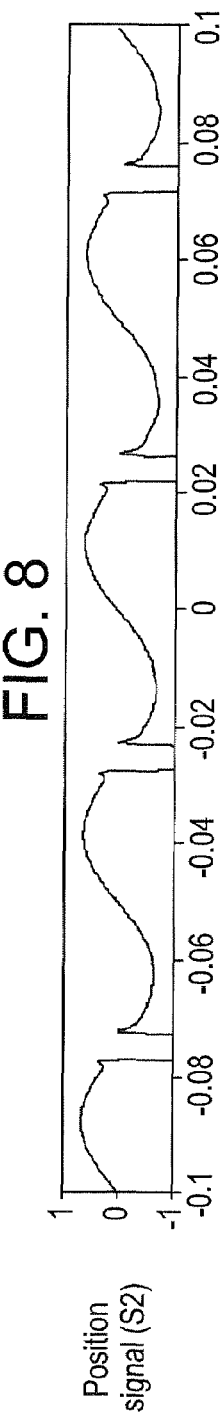
FIG. 8 is a schematic of position signal (S2) generated by low pass filtering the signal (S1)
Figure 9:
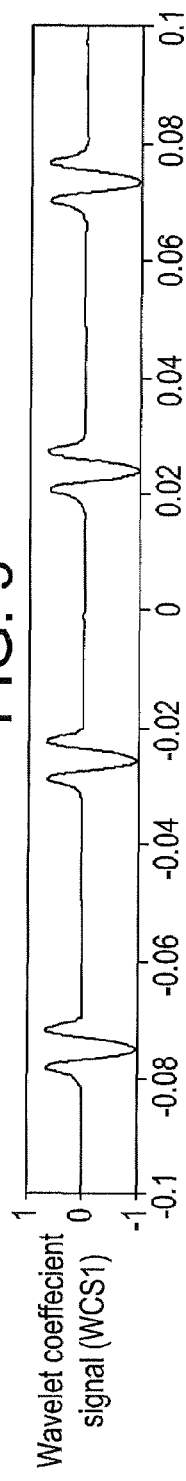
FIG. 9 is a schematic of a wavelet coefficient signal (WCS1) generated by a computer that is indicative of a corrupted portion of the signal (S1)
Figure 10:
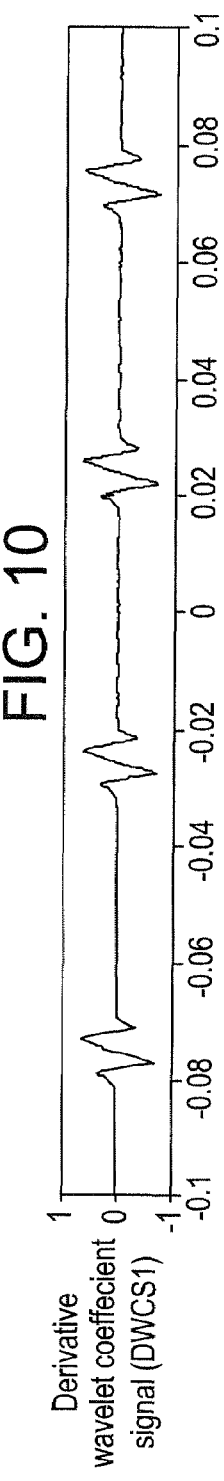
FIG. 10 is a schematic of a derivative wavelet coefficient signal (DWCS1), calculated by a computer based on the signal (WCS1)
Figure 11:
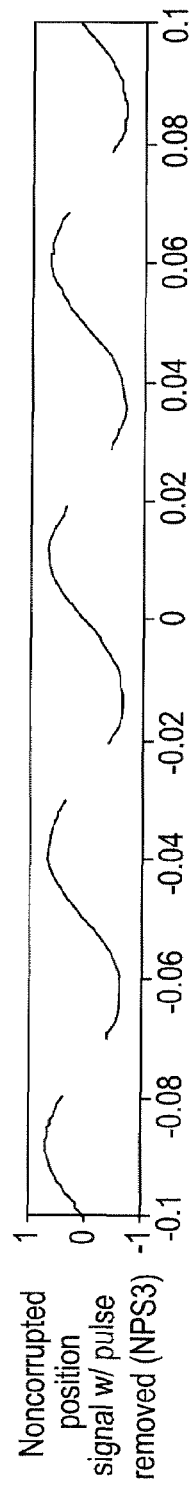
FIG. 11 is a schematic of a non-corrupted position signal (NPS3) generated using the signals (S2), (WCS1), (DWCS1), having a corrupted portion removed therefrom.
Figure 12:
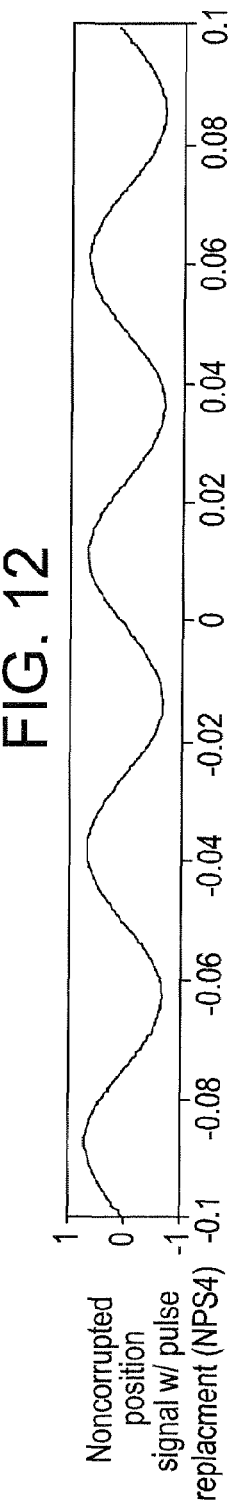
FIG. 12 is a schematic of a non-corrupted position signal (NPS4) generated using the signal (NPS3) having a corrupted portion replaced with a non-corrupted portion.
Figure 13:
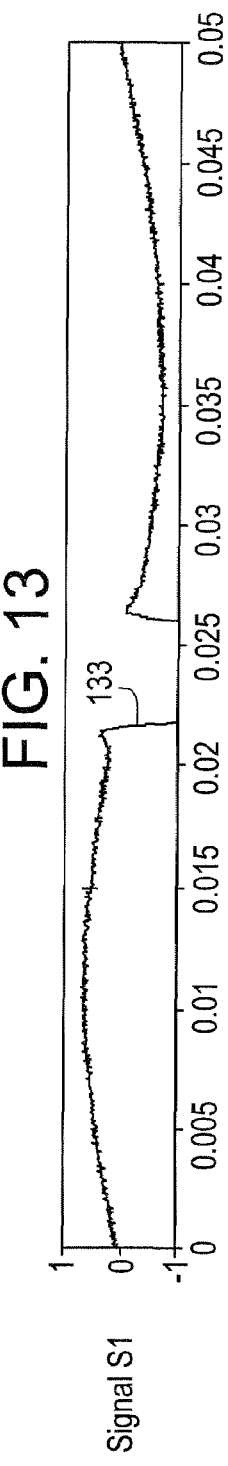
FIG. 13 is a schematic of an enlarged portion of the signal (S1) of FIG. 7.
Figure 14:
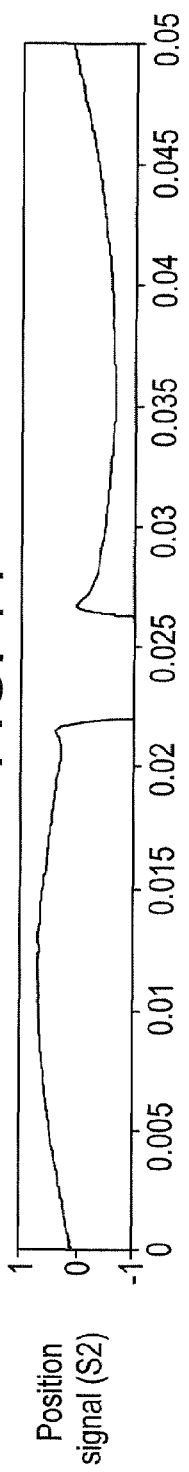
FIG. 14 is a schematic of an enlarged portion of the signal (S2) of FIG. 8.
Figure 19:
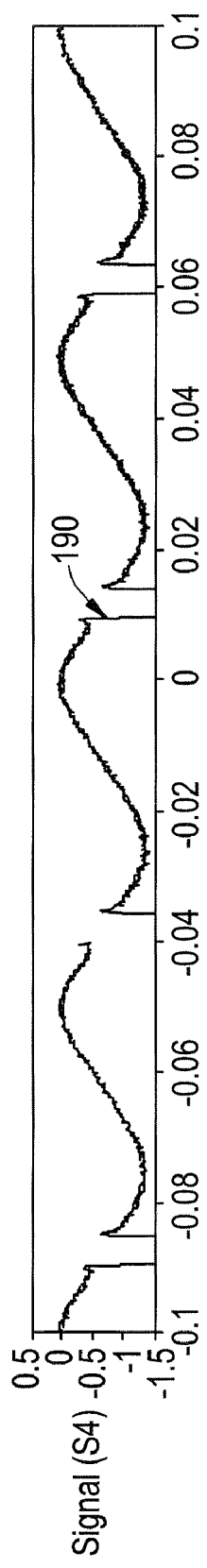
FIG. 19 is a schematic of a signal (S4) generated by a second eddy current sensor.
Figure 20:
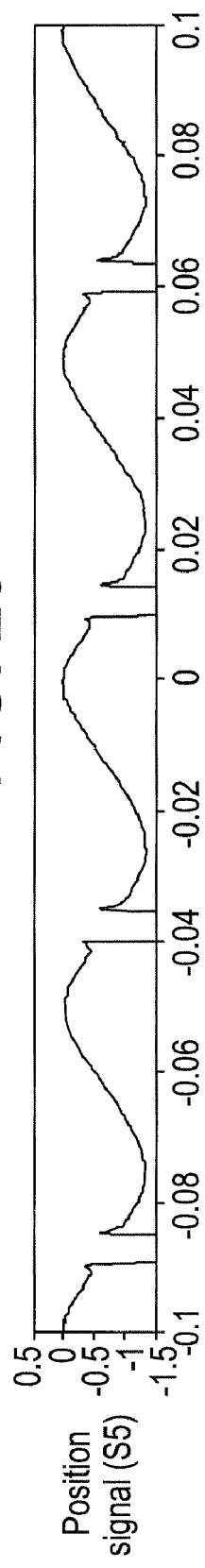
FIG. 20 is a schematic of position signal (S5) generated by low pass filtering the signal (S4)
Figure 21:
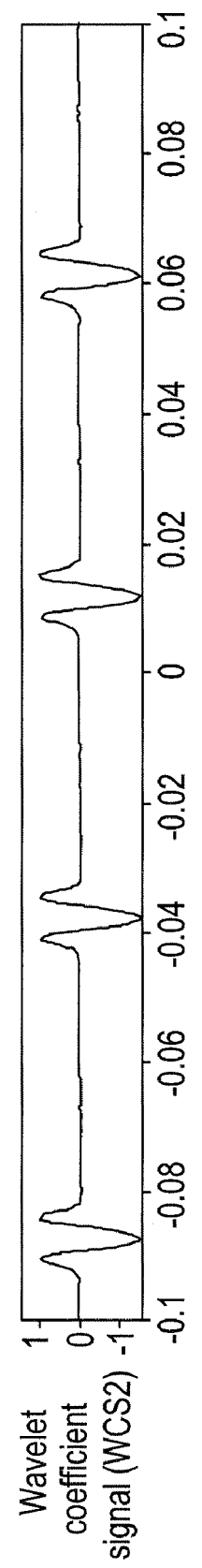
FIG. 21 is a schematic of a wavelet coefficient signal (WCS2) generated by a computer that is indicative of a corrupted portion of the signal (S4)
Figure 22:
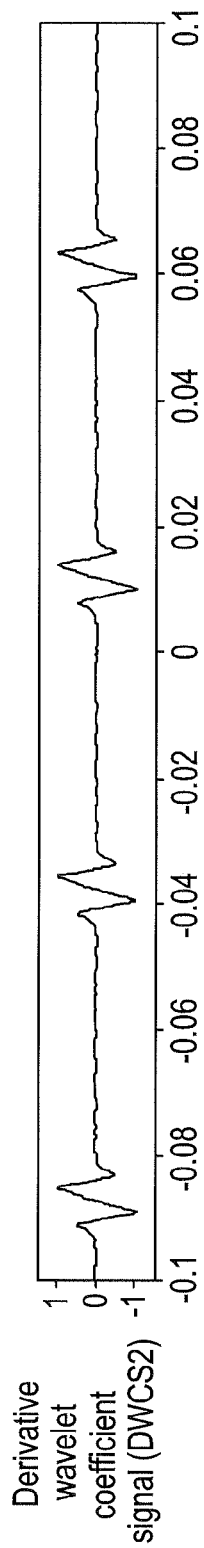
FIG. 22 is a schematic of a derivative wavelet coefficient signal (DWCS2) calculated by a computer based on the signal (WCS2)
Figure 23:
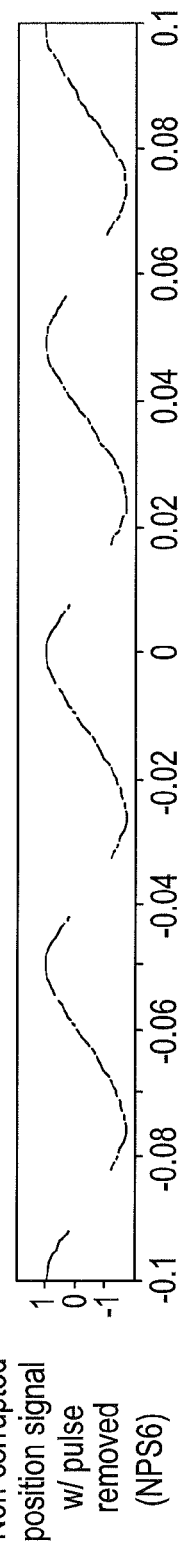
FIG. 23 is a schematic of a non-corrupted position signal (NPS6) generated using the signals (S4), (WCS2), (DWCS2), having a corrupted portion removed therefrom.
Figure 24:
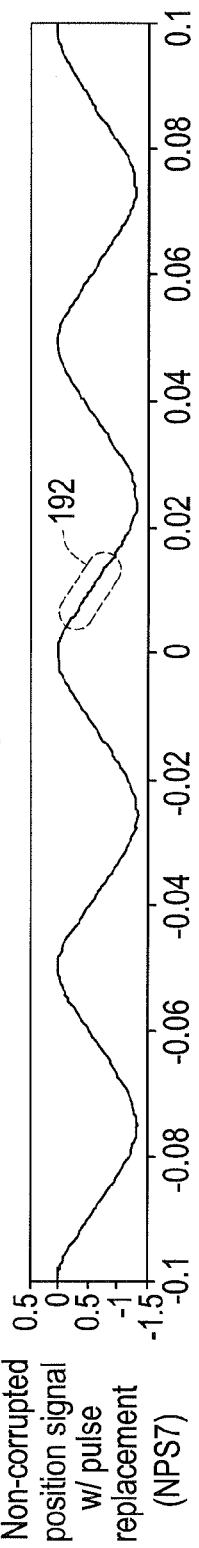
FIG. 24 is a schematic of a non-corrupted position signal (NPS7) generated using the signal (NPS6) having a corrupted portion replaced with a non-corrupted portion.

Referring to FIGS. 7, 13, and 19, a brief explanation of the signals (S1) and (S4) will be now be provided. The sensor 30 generates the signal (S1) indicative of a distance of an outer surface of the rotor 20 with respect to the sensor 30. The signal (S1) has a generally sinusoidal shape that indicates a radial position of an outer surface (and a center point 26) of the rotor 20 during rotation of the rotor 20. When the slot 24 rotates pass the sensor 30, a corrupted portion 133 is induced in the signal (S1). The corrupted portion 133 of the signal (S1) is thus indicative of an angular position of the rotor 20. Similarly, the sensor 32 generates the signal (S4) indicative of a distance of an outer surface of the rotor 20 with respect to the sensor 32. The signal (S4) has a generally sinusoidal shape that indicates a radial position of an outer surface (and the center point 26) of the rotor 20 during rotation of the rotor 20. When the slot 24 rotates pass the sensor 32, a corrupted portion 190 is induced in the signal (S4). The corrupted portion 190 of the signal (S4) is thus indicative of an angular position of the rotor 20.

The computer 34 is provided to calculate both an angular position of the rotor 20 and a radial position of the rotor 20 based upon the signals (S1) and (S4). The computer 34 is electrically coupled to the sensors 30, 32, the display device 36, and the keyboard 37. The computer 34 receives user selection information via the keyboard 37.

The display device 36 is provided to display signals generated either by the sensors 30, 32 or the computer 34.

Referring to FIGS. 3–6, and FIGS. 7–24, a method for determining an angular position of the rotor 20 and a radial position of the rotor 20 will now be explained. The method is implemented utilizing the monitoring system 14 described above.

At step 50, the sensor 30 disposed proximate the slot 24 of the rotation rotor 20 generates the signal (S1).

At step 52, the computer 34 low-pass filters the signal (S1) to obtain a position signal (S2). It should be noted that step 52 is an optional step. In an alternate embodiment, where the step 52 is removed, the remaining steps would utilize position signal (S1) instead of the position signal (S2).

At step 54, the computer 34 determines a first angular position of the rotor by identifying a corrupted portion 133 of the position signal (S2). The step 54 is implemented utilizing steps 80–94 that will now be explained.

At step 80, the computer 34 makes a determination as to whether a user selected to determine the corrupted portion 133 of the position signal (S2) using a first technique. If the value of step 80 equals "yes", the method advances to step 82. Otherwise, the method advances to step 88.

At step 82, the computer 34 determines a time interval when an amplitude of the position signal (S2) is greater than a predetermined threshold value.

At step 84, the computer 34 determines the corrupted portion 133 of the position signal (S2) based on the time interval.

At step 86, the computer 34 determines the first angular position of the rotor 20 based on the corrupted portion 133 of the position signal (S2).

At step 88, the computer 34 makes a determination as to whether a user has selected to determine the corrupted portion 133 of the position signal (S2) using a second technique. If the value of step 88 equals "yes", the method advances to step 90. Otherwise, the method advances to step 56.

At step 90, the computer 34 generates a wavelet coefficient signal (WCS1) utilizing a wavelet transform equation. The wavelet coefficient signal (WCS1) comprises a plurality of wavelet coefficient values, each wavelet coefficient value indicating a similarity between an amplitude of the position signal (S2) and a predetermined function. Each wavelet coefficient value indicates a portion of the corrupted portion 133 of the position signal (S2) when an absolute value of the wavelet coefficient value is greater than a first predetermined threshold value. For example, referring to FIG. 15, the regions 140, 142, 144 cover a portion of the corrupted portion 133 where the absolute values of the wavelet coefficient values of signal (WCS1) are greater than a threshold value of 0.91.

At step 92, the computer 34 generates a derivative wavelet coefficient signal (DWCS1) by determining a derivative of the wavelet coefficient signal (WCS1). The derivative wavelet coefficient signal (DWCS1) comprises a plurality of derivative wavelet coefficient values. Each derivative wavelet coefficient value indicates a portion of the corrupted portion 133 when an absolute value of the derivative wavelet coefficient value is greater than a second predetermined threshold value. For example, referring to FIG. 16, the regions 150, 152, 154, 156 represent a portion of the corrupted portion 133 where the absolute values of the derivative wavelet coefficient values of signal (DWCS1) are greater than a threshold value of 0.2.

At step 94, the computer 34 determines the first angular position of the rotor 20 based on the corrupted portion 133 of the position signal (S2). After step 94, the method advances to step 56.

At step 56, the computer 34 removes the corrupted portion 133 of the position signal (S2) to obtain a non-corrupted signal (NPS3).

At step 58, the computer 34 generates a non-corrupted portion 170 utilizing a Fourier transform. The non-corrupted portion 170 represents a portion of the signal (S1) that would be present in the signal (NPS3) if the slot 24 was not utilized in the rotor 20.

At step 60, the computer 34 replaces a region of the position signal (NPS3) previously occupied by the corrupted portion 133 with the non-corrupted portion 170 to obtain a non-corrupted position signal (NPS4).

At step 62, the computer 34 determines a first radial coordinate of the center point 26 of the rotor 20 based on the non-corrupted position signal (NPS4). It should be noted that in an alternate embodiment, the first radial coordinate of the center point 26 is determined based on the non-corrupted position signal (NPS3), instead of the position signal (NPS4).

At step 64, the eddy current sensor 32 disposed proximate the slot 24 of the rotating rotor 20 generates a signal (S4).

At step 66, the computer 34 low-pass filters the signal (S4) to obtain a position signal (S5). It should be noted that step 66 is an optional step. In an alternate embodiment, where the step 66 is removed, the remaining steps would utilize position signal (S4) instead of the position signal (S5).

At step 68, the computer 34 determines a second angular position of the rotor by identifying a corrupted portion 190 of the position signal (S5). It should be noted that the step 68 is implemented utilizing steps substantially similar to those utilized for step 56 described above, utilizing signals (WCS2) and (DWCS2).

At step 70, the computer 34 removes the corrupted portion 190 of the position signal (S5) to obtain a non-corrupted position signal (NPS6).

At step 72, the computer 34 generates a non-corrupted portion 192 utilizing a Fourier transform. The non-corrupted portion 192 represents a portion of the signal (S4) that would be present in the signal NPS6 if the slot 24 was not utilized in the rotor 20.

At step 74, the computer 34 replaces a region of the position signal (NPS6) previously occupied by the corrupted portion 190 with the non-corrupted portion 192 to obtain a non-corrupted position signal (NPS7).

At step 76, the computer 34 determines a second radial coordinate of the center point 26 of the rotor 20 based on the non-corrupted position signal (NPS7).

Figure 25:
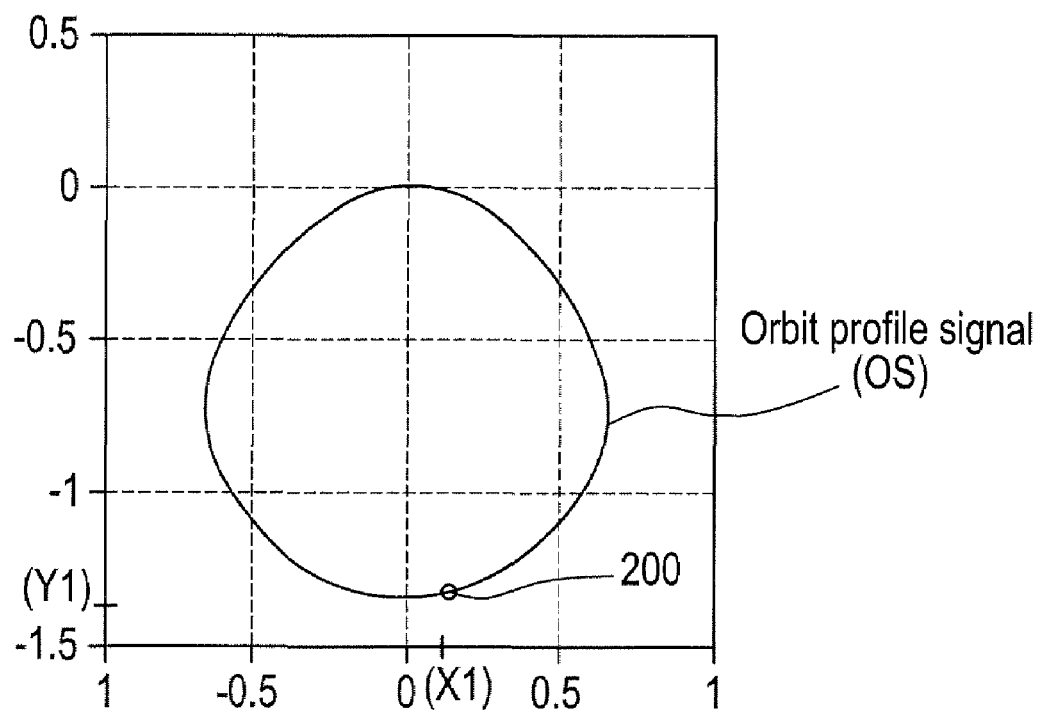
FIG. 25 is a schematic of an orbit signal generated using the non-corrupted position signal (NPS7).

At step 78, the computer 34 generates a portion of an orbit profile signal (OS) indicative of the radial position of the center point 26 of the rotor 20 based on at least the first radial coordinate and the second radial coordinate. For example, referring to FIG. 25, the computer 34 generates a point 200 of the orbit profile signal (OS) based on the first radial coordinate and the second radial coordinate specified by the signals (NPS4) and (NPS7), respectively. It should be noted, that in an alternate embodiment, the point 200 could be determined based on the first radial coordinate (X1) and the second radial coordinate (Y1) specified by the signals (NPS3) and (NPS6), respectively.

The facility monitoring system and method in accordance with exemplary embodiments provide a substantial advantage over other systems and methods. In particular, the system and method provide a technical effect of measuring both an angular position and a radial position of a rotor proximate a portion of the rotor containing a slot utilizing two sensors disposed proximate the slot.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the invention. When implemented on a general-purpose microprocessor, the computer program code segments configure the microprocessor to create specific logic circuits.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

What is claimed is:

1. A method for determining an angular position of a rotating device and a radial position of the rotating device, the rotating device having either a slot or a protrusion on the rotating device, the rotating device being centered about a center point, the method comprising:

generating a first signal utilizing a first sensor disposed proximate the slot or protrusion of the rotating device;

determining a first angular position of the rotating device by identifying a corrupted portion of the first signal;

removing the corrupted portion of the first signal to obtain a non-corrupted position signal by generating a non-corrupted portion utilizing a Fourier transform applied to the first signal and replacing the corrupted portion of the first signal with the non-corrupted portion to obtain the non-corrupted position signal; and determining a first radial coordinate of the center point of the rotating device based on the non-corrupted position signal.

2. The method of claim 1, further comprising:

generating a third signal utilizing a second sensor disposed proximate the slot or protrusion of the rotating device, the second sensor being disposed at a predetermined angle relative to the first sensor;

determining a second angular position of the rotating device by identifying a corrupted portion of the third position signal;

removing the corrupted portion of the third position signal to obtain another non-corrupted position signal; and determining a second radial coordinate of the center point of the rotating device based on the another non-corrupted position signal.

3. The method of claim 2, further comprising:

iteratively performing the step of determining the first radial coordinate when the rotating device is rotating to obtain a plurality of first radial coordinates;

iteratively performing the step of determining the second radial coordinate when the rotating device is rotating to obtain a plurality of second radial coordinates; and generating an orbit profile signal indicative of the radial position of the center point during at least one revolution of the rotating device based on the plurality of first radial coordinates and the plurality of second radial coordinates.

4. The method of claim 1, wherein the first sensor comprises an eddy current proximity sensor.

5. The method of claim 1, wherein the step of determining the first angular position of the rotating device by identifying the corrupted portion of the first signal comprises:

determining a time interval when an amplitude of the first signal is greater than a predetermined threshold value.

6. The method of claim 1, wherein the step of determining the first angular position of the rotating device by identifying the corrupted portion of the first signal comprises:

generating a first wavelet coefficient signal utilizing a wavelet transform equation, the first wavelet coefficient signal comprising a plurality of wavelet coefficient values, each wavelet coefficient value indicating a similarity between an amplitude of the first signal and a first predetermined function, each wavelet coefficient value indicating a portion of the corrupted portion of the first signal when the wavelet coefficient value is greater than a first predetermined threshold value; and generating a derivative wavelet coefficient signal by determining a derivative of the wavelet coefficient signal, the derivative wavelet coefficient signal comprising a plurality of derivative wavelet coefficient values, each derivative wavelet coefficient value indicating a portion of the corrupted portion when the derivative wavelet coefficient value is greater than a second predetermined threshold value; and determining the first angular position of the rotating device based on the first wavelet coefficient signal and the derivative wavelet coefficient signal.

7. A system for determining an angular position of a rotating device and a radial position of the rotating device, the rotating device having either a slot or a protrusion on the rotating device, the rotating device begin centered about a center point, the system comprising:

a first sensor disposed proximate the slot or the protrusion of the rotating device, the first sensor configured to generate a first signal; and a computer operably coupled to the first sensor and receiving the first signal, the computer configured to determine a first angular position of the rotating device by identifying a corrupted portion of the first signal, the computer further configured to remove the corrupted portion of the first signal to obtain a non-corrupted position signal by generating a non-corrupted portion utilizing a Fourier transform applied to the first signal and the replacing the corrupted portion of the first signal with the non-corrupted portion to obtain the non-corrupted position signal, the computer further configured to determine a first radial coordinate of the center point of the rotating device based on the non-corrupted position signal.

8. The system of claim 7, further comprising:

a second sensor disposed proximate the slot or the protrusion of the rotating device, the second sensor configured to generate a third signal; and the computer being further operably coupled to the second sensor, the computer being further configured to determine a second angular position of the rotating device by identifying a corrupted portion of the third position signal, the computer being further configured to remove the corrupted portion of the third position signal to obtain a another non-corrupted position signal, the computer being further configured to determine a second radial coordinate of the center point of the rotating device based on the another non-corrupted position signal.

9. The system of claim 7, wherein the computer is further configured to iteratively determine the first radial coordinate when the rotating device is rotating to obtain a plurality of first radial coordinates, the computer being further configured to iteratively determine the second radial coordinate when the rotating device is rotating to obtain a plurality of second radial coordinates, the computer being further configured to generate an orbit profile signal indicative of the radial position of the center point based on the plurality of first radial coordinates and the plurality of second radial coordinates.

10. The system of claim 7, wherein the first sensor comprises an eddy current proximity sensor disposed proximate the rotating device, wherein the slot or protrusion of the rotating device induces the first sensor to output the corrupted portion of the first signal when the slot or protrusion rotates past the first sensor.

11. The system of claim 7, wherein the computer is further configured to determine a time interval when an amplitude of the first signal is greater than a predetermined threshold value.

12. The system of claim 7, wherein the computer is further configured to generate a wavelet coefficient signal utilizing a wavelet transform equation, the first wavelet coefficient signal comprising a plurality of wavelet coefficient values, each wavelet coefficient value indicating a similarity between an amplitude of the first signal and a first predetermined function, each wavelet coefficient value indicating a portion of the corrupted portion of the first signal when the wavelet coefficient value is greater than a first predetermined threshold value, the computer being further configured to generate a derivative wavelet coefficient signal by determining a derivative of the wavelet coefficient signal, the derivative wavelet coefficient signal comprising a plurality of derivative wavelet coefficient values, each derivative wavelet coefficient value indicating a portion of the corrupted portion when the derivative wavelet coefficient value is greater than a second predetermined threshold value, the computer being further configured to determine the first angular position of the rotating device based on the first wavelet coefficient signal and the derivative wavelet coefficient signal.

13. An article of manufacture, comprising:

a computer storage medium having a computer program encoded therein for determining an angular position of a rotating device and a radial position of the rotating device, the rotating device having a slot or a protrusion, the rotating device being centered about a center point, the computer storage medium comprising:

code for sampling a first signal from a first sensor disposed proximate the slot or the protrusion of the rotating device;

code for determining a first angular position of the rotating device by identifying a corrupted portion of the first signal;

code for removing the corrupted portion of the first signal to obtain a non-corrupted position signal by generating a non-corrupted portion utilizing a Fourier transform applied to the first signal and replacing the corrupted portion of the first signal with the non-corrupted portion to obtain the non-corrupted position signal; and code for determining a first radial coordinate of the center point of the rotating device based on the non-corrupted position signal.

14. The article of manufacture of claim 13, wherein the computer storage medium further comprises:

code for sampling a third signal from a second sensor disposed proximate the slot or the protrusion of the rotating device;

code for determining a second angular position of the rotating device by identifying a corrupted portion of the third signal;

code for removing the corrupted portion of the third signal to obtain a another non-corrupted position signal; and code for determining a second radial coordinate of the center point of the rotating device based on the another non-corrupted position signal.

15. The article of manufacture of claim 13, wherein the computer storage medium further comprises:

code for iteratively determining the first radial coordinate when the rotating device is rotating to obtain a plurality of first radial coordinates, code for iteratively determining the second radial coordinate when the rotating device is rotating to obtain a plurality of second radial coordinates, and, code for generating an orbit profile signal indicative of the radial position of the center point during at least one revolution of the rotating device based on the plurality of first radial coordinates and the plurality of second radial coordinates.

16. The article of manufacture of claim 13, wherein the code for determining the first angular position of the rotating device by identifying the corrupted portion of the first signal comprises:

code for generating a first wavelet coefficient signal utilizing a wavelet transform equation, the first wavelet coefficient signal comprising a plurality of wavelet coefficient values, each wavelet coefficient value indicating a similarity between an amplitude of the first signal and a first predetermined function, each wavelet coefficient value indicating a portion of the corrupted portion of the first signal when the wavelet coefficient value is greater than a first predetermined threshold value; and code for generating a derivative wavelet coefficient signal by determining a derivative of the wavelet coefficient signal, the derivative wavelet coefficient signal comprising a plurality of derivative wavelet coefficient values, each derivative wavelet coefficient value indicating a portion of the corrupted portion when the derivative wavelet coefficient value is greater than a second predetermined threshold value; and code for determining the first angular position of the rotating device based on the first wavelet coefficient signal and the derivative wavelet coefficient signal.

* * * * *

UNITED STATES PATENT AND TRADEMARK OFFICE
CERTIFICATE OF CORRECTION

PATENT NO. : 7,069,173 B2
APPLICATION NO. : 10/904258
DATED : June 27, 2006
INVENTOR(S) : Grant et al.

It is certified that error appears in the above-identified patent and that said Letters Patent is hereby corrected as shown below:

Column 4:
Line 48, after "a" insert -- first --

Column 8:
Line 43, after "a" insert -- first --

Signed and Sealed this

Fifth Day of December, 2006

JON W. DUDAS
*Director of the United States Patent and Trademark Office*